United States Patent [19]
Müller

[11] 3,834,183
[45] Sept. 10, 1974

[54] DRIVE CLUTCH

[75] Inventor: Erich Müller, Beutelsbach, Germany

[73] Assignee: Andreas Stihl Maschinenfabrik, Badstrasse, Neustadt, Germany

[22] Filed: Jan. 10, 1973

[21] Appl. No.: 322,433

[30] Foreign Application Priority Data
Jan. 12, 1972 Germany.......................... 2201297

[52] U.S. Cl. ................. 64/15 R, 64/27 R, 64/27 B, 64/30 E, 192/56 R, 192/79, 144/35
[51] Int. Cl............................................. F16d 3/52
[58] Field of Search....... 64/15 B, 15 R, 15 C, 27 B, 64/30 E, 27 R, 27 C, 30 R; 192/79, 56 R, 80, 104 C, 104 R; 144/35

[56] References Cited
UNITED STATES PATENTS
1,962,993  6/1934  Leece................................. 64/15 B
2,074,625  3/1937  Spaunburg .......................... 64/27 B
2,783,794  3/1957  Kroll..................................... 144/35
2,907,190  10/1959 Pastor ................................. 64/15 R
3,339,596  9/1967  Deelman............................. 64/27 R
3,363,478  1/1968  Lanning........................... 64/27 R X Primary Examiner—Samuel Scott
Assistant Examiner—Randall Heald
Attorney, Agent, or Firm—Walter Becker

[57] ABSTRACT

A drive clutch, especially for detachably connecting a motor to a tool, in which the motor and tool have respective drums connected thereto adapted to be placed in coaxial, coextensive, telescopic relation. A friction element in the radial space between the drums frictionally connects the drums with each other. The friction element may be in the form of an undulating spring carried by one of the drums and engageable with the other.

20 Claims, 5 Drawing Figures

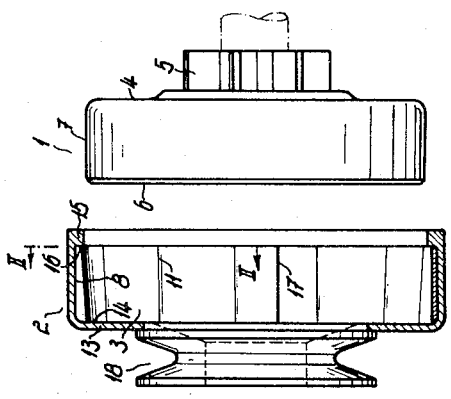
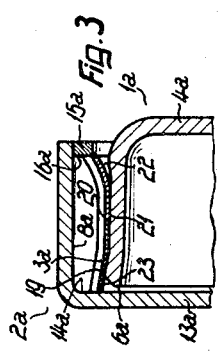
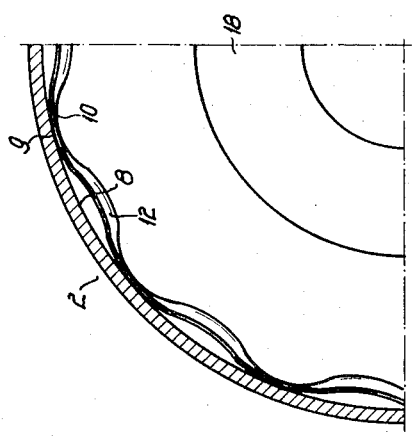

DRIVE CLUTCH

The present invention relates to a driving clutch device for detachably drivingly connecting the motor of a working implement, especially a motor chain saw, to an auxiliary device, for instance, an abrasive and cutting-off machine, while the working implement is equipped with an easily accessible clutch drum.

It is an object of the present invention to provide a driving clutch device of the type involved which will assure a driving connection which can safely and easily be established even though the manufacturing tolerances of the clutch elements are relatively great.

This object and other objects and advantages of the invention will appear more clearly from the following specification in connection with the accompanying drawings, in which:

FIG. 1 illustrates a clutch device according to the invention, partly in view and partly in axial section.

FIG. 2 represents a section taken along the line II—II of FIG. 1 but on a larger scale than the latter.

FIG. 3 is a section through a portion of a further embodiment of the invention.

Figure 4:
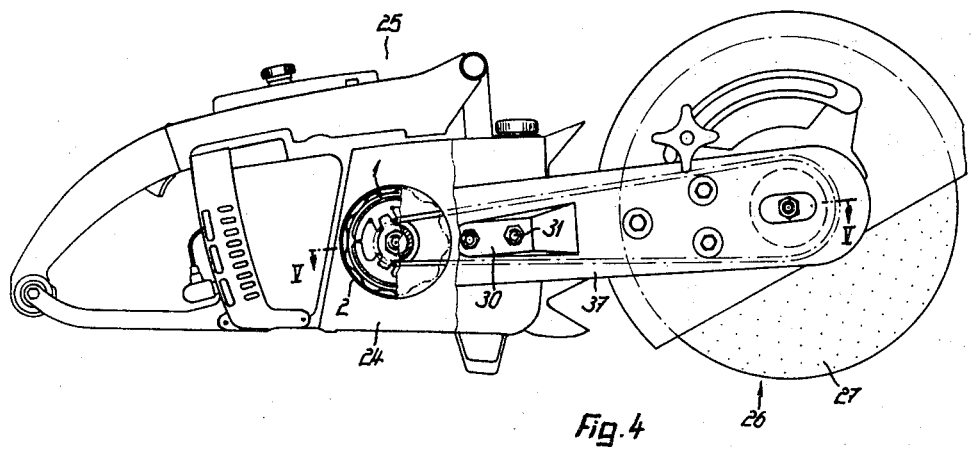
FIG. 4 illustrates a side view of a motor chain saw having connected thereto an abrasive and cutting-off machine by means of a clutch device according to the invention.

The driving clutch device according to the present invention is characterized by an output drum which is adapted detachably to be mounted on a clutch drum forming one clutch element of the clutch device, while the output drum forms the other clutch element of the clutch device, and furthermore characterized in that on the inner mantle surface of the output drum there is mounted an elastic friction element for the frictional engagement with the outer mantle surface of the clutch drum. In this way no structural changes are necessary on the clutch drum provided on the working element so that the clutch drum will at any rate be suitable for the driving connection with the additional or auxiliary device.

The clutch device according to the invention is suitable for motor chain saws with inner output sprocket wheel and also for motor chain saws with outer output sprocket wheel, while in the first mentioned instance the end face of the clutch drum on the mounting side is formed by the open side of the clutch drum, whereas in the second instance it is formed by the closed end face of the clutch drum.

A particularly safe driving connection is obtained when the friction element is substantially uniformly distributed about the axis of the output drum. The friction element may form one single piece. However, it is also possible that the friction element is formed by segments arranged around the axis of the driving drum. Adjacent segments may be arranged in spaced relationship to each other or may abut each other.

A particularly safe and highly wear-resistant driving connection will be assured when the friction element is formed by at least one undulated spring of spring steel or the like which is arranged about the axis of the output drum and is undulated in circumferential direction. This spring may expediently be undulated in a sinusoidal way. However, the spring may for certain purposes of application also be undulated in a star-shaped manner with approximately plane flanks while preferably the transition sections between the flanks are rounded with small radii.

Clutch drums of working implements, especially of motor chain saws, are in most instances produced as deep drawn elements and therefore have no precise cylindrical outer mantle. Instead, the outer mantle surface is slightly conically widened toward the open end face of the clutch drum. Moreover, the marginal area of the outer mantle surface which area is located at the open and/or at the closed end face is opening outwardly which means that the marginal area widens still further than the mantle of the clutch drum in the remaining region. In particular, in this instance, it is advantageous if, when viewed in an axial section through the output drum, the cross section of the friction elements is at least within the region of its friction surfaces facing the clutch drum approximately the same as the cross section of the outer mantle surface of the clutch drum so that a relatively large surface engagement of the friction element with the clutch drum is obtained, and in the axial direction of the clutch drum there is formed a kind of positive connection between the clutch drum and the friction element.

It is particularly expedient when, viewed in axial section through the output drum, at least those friction surfaces which are associated with the clutch drum extend toward the open and/or toward the oppositely located end face of the output drum away from the axis of the output drum. In this way a funnel-shaped widening of the friction element is obtained to such an extent that the clutch drum can easily be plugged in. An advantageous design is obtained when substantially exclusively the friction surfaces associated with the clutch drum extend in the direction toward the open end face of the output drum away from the axis whereas the adjacent parts of the friction elements extend at a small angle or parallel to the axis of the output drum. For facilitating the placing of the output drum onto the clutch drum, the outer mantle surface of the clutch drum may have its end face on the mounting side provided with a chamfer, a rounding or the like. This design may be such that, when viewed in axial section of the output drum, the cross section of the friction element protrudes at least within the region of its friction surfaces associated with the clutch drum between the crosssectional ends toward the output drum axis so that the friction surfaces catch behind the upwardly directed margin of the clutch drum. For further improving the frictional connection between the friction element and the clutch drum, when viewed in axial section through the output drum, the cross section of the friction element is at least within the region of its friction surfaces associated with the clutch drum so designed that in the central cross-sectional region the cross section of the friction element flares toward the open end face of the output drum in conformity with the conicity of the clutch drum away from the axis of the output drum.

The undulated spring can be manufactured in a very simple manner if it is undulated over the entire axial extension.

In order to be able to absorb great differences in tolerances, it is expedient when the friction element has a relatively long spring stroke and a possibly flat spring characteristic. Such flat spring characteristic can be obtained with an undulated spring by a wide spacing of the undulations, by a minor thickness of the sheet metal and by a small width of the sheet metal. It is particularly advantageous in this connection when the two tangents tangential to the ends of each undulation of the undulated spring will in the clutching and/or the disengaged condition be located relative to each other at an obtuse angle of preferably 140°.

The undulated spring may in a simple manner be formed by a curved undulated spring band the ends of which are preferably located directly adjacent to each other and engage the inner mantle surface of the output drum. However, it is also possible to form the undulated spring by a closed undulated spring ring.

In order in no way to affect the spring properties, the friction element is positively secured exclusively axially with regard to the output drum. The friction element is located between two annular shoulders, and the inner diameter of the annular shoulders located at the open end face of the outer drum is greater than the diameter along which are located the friction surfaces associated with the clutch drum. For transferring the torque, also the friction element engages the output drum as well as the clutch drum merely in a frictional manner. Advantageously, the friction surfaces by means of which the friction element engages the inner circumferential surface of the output drum extends over the entire axial extension of the friction element. When designing the friction element as undulated spring, thus advangeously the undulations associated, for instance, with the clutch drum are conical whereas the undulations which are associated in particular with the cylindrical inner circumference of the output drum extend in an axis-parallel manner to the output drum.

The clutch device according to the invention is also suitable as overload safety device for the working implement or the auxiliary device. For purposes of controlling the maximum torque to be conveyed by the clutch device, it is possible to provide an intermediate element between a friction surface of the friction element and the pertaining counter friction surface, especially the counter friction surface of the output drum. By means of this intermediate element the friction value may be varied. As intermediate element, for instance, a steel band or the like may be inserted. Furthermore it is possible as intermediate element to introduce a consistent mass as, for instance, grease or a similar lubricant.

In order to be able to drive the tool of the auxiliary device in a simple manner, the outside of the end wall of the output drum has connected thereto an output element, for instance, a pulley for a V-belt, a shaft coupling or the like. Thus, the drive drum may, for instance, drive an auxiliary device directly which means without a step-up or step-down transmission.

Referring now to the drawings in detail, a drive-clutch device according to the invention as illustrated in FIGS. 1 and 2 comprises a clutch drum 1 and an output drum 2 detachably connectable to the drum 1 by means of an undulated spring 3.

Clutch drum 1 is adapted in any convenient or standard manner to be connected to a working implement, for instance, a motor chain saw while the clutch drum 1 is rotatably journaled, for instance, on the crankshaft (indicated in dash lines in FIG. 4) of the internal combustion engine associated with the working implement. A rotor located within the clutch drum 1 is connected to the crankshaft and is provided, for instance, with centrifugal fly elements which are adapted at a certain speed to establish a driving connection between said clutch rotor and the clutch drum 1 so that the latter will rotate together with the crankshaft. According to the specific embodiment shown in the drawing, a sprocket wheel 5 is connected to that end face wall 4 of the clutch drum 1 which faces toward the internal combustion engine for the working implement. The saw chain of the working implement, in this instance a motor chain saw, passes over the sprocket wheel 5 in conformity with the illustrated embodiment. The open end face 6 of the clutch drum 1 thus points away from the internal combustion engine of the working implement. According to the illustrated embodiment of the invention, the outer mantle surface 7 of the clutch drum 1 is substantially cylindrical and is provided with a chamfer at the open end face 6.

The output drum 2 which similar to the clutch drum 1 may form a deep drawn element has a substantially cylindrical inner mantle surface 8, the diameter of which is greater than the diameter of the outer mantle surface 7 of clutch drum 1. This inner mantle surface 8 is engaged by the undulated spring at least in engaged condition, along linear contacting surfaces 9 which are formed by the convexly curved undulations 10, with regard to the inner mantle surface 8 of the undulated spring 3, said undulating spring extending around the axis of the drive drum 2. The shafts 12 of the undulated spring 3 which are convexly curved with regard to the axis of the output drum 2 form linear friction surfaces 11 which are associated with the outer mantle surface 7 of clutch drum 1 and in engaged position engage said drum 1. The undulated spring 3 is in axial direction secured relative to the output drum 2 by engaging two annular shoulders 14, 16. One annular shoulder 14 is formed by the inner surface of the end face wall 13 of the output drum 2, and the other annular shoulder 16 is formed by the inner surface of a radially inwardly protruding marginal area 15 at the open side of the output drum 2. The inner diameter of the annular marginal area 14 is greater than the diameter of the outer mantle surface 7 of clutch drum 1 and is furthermore greater than the maximum diameter on which are located the friction surfaces 11 of spring 3 which are associated with the clutch drum 1.

The undulated spring forming an undulated spring ring 3 is slightly conically widened in the direction toward the open side of the output drum 2 so that the output drum 2 can easily with the undulated spring ring 3 be slipped upon the clutch drum 1, in which instance the friction surfaces 11 approximately over their entire axial extension continually engage the outer mantle surface 7 of the clutch drum 1. In this way, a frictional drive connection is established between clutch drum 1 and output drum 2.

As illustrated in FIGS. 1 and 2, the undulations 10 of the undulated spring which are associated with the inner mantle surface 8 of the output drum 2 are at least within the region of the engaging or friction surface 9 arranged axis parallel to the output drum 2 in such a way that only the contacting surfaces 11 which are formed by the undulations 12 and are associated with the clutch drum 1 are located in a conical mantle surface.

The undulated spring 3 is, in conformity with the embodiment illustrated by way of example in the drawings, formed by a bent undulated spring band, the ends of which are located directly adjacent to each other at 17, these ends engaging the inner mantle surface 8 of the output drum 2.

A V-belt pulley 18 is connected to the outside of the end wall face 13 of the output drum 2. A V-belt may be placed upon said pulley 18 for driving an auxiliary device, for instance, a cutting-off machine. In the V-belt pulley 18 there may furthermore be journaled a back-off spindle which is accessible from the outer end face side of pulley 18 and which with the output drum 2 clutched to the clutch drum 1 may be loaded against the end face of the crankshaft so that the output drum 2 is pressed away from the clutch drum 1. The back-up spindle (not illustrated in detail) may be guided in a threaded sleeve which in its turn is rotatably journaled in pulley 18.

FIG. 3 shows a further embodiment of a clutch device according to the invention in engaged condition. Parts corresponding to those described in connection with FIGS. 1 and 2 are designated with the same reference numerals as in FIGS. 1 and 2 but with the additional letter a. When producing the clutch direction 1a as a deep-drawn element, for reasons of manufacture, the cross-sectional shape illustrated in FIG. 3 is obtained according to which the outer mantle surface is, within the region 19 of the open marginal area 6a of clutch drum 1a bent outwardly, whereas in the intermediate range 20 it is conically widened toward the open side 6a at a lower angle than within the marginal region 19. The cross section of the undulated spring 3a is in particular for adapting the same to the conditions specifically described above so designed that the linear friction surfaces of the undulated spring 3a which are associated with the clutch drum 1a comprise a central section 21 which engages the region 20 of the outer mantle surface of clutch drum 1a and has the same ascension as the region 20. This central section 21 is followed by cross-sectional sections 22, 23 which respectively extend toward the pertaining end of the spring 3a away from the axis of the output drum 2a. In this way, within the region of the open side of the output drum 2a there is formed a funnel-shaped widening of the undulated ring 3a so that the clutch drum 1a can easily be inserted thereinto. The cross-sectional end region 23 in the vicinity of the end face wall 13a of the output drum 2a serves for engagement with the upwardly bent marginal region 19 of the outer mantle surface of clutch drum 1a. When output drum 2a is placed upon the clutch drum 1a, the intermediate cross/sectional sections 21 of the undulated spring ring 3a spring behind the outwardly bent marginal region 19 of the outer mantle surface of clutch drum 1a so that an axially directed force component acts upon the output drum 2a which force component pulls the output drum 2a upon the clutch 1a. One annular shoulder 16a which serves for supporting the undulated spring 3a is with the embodiment illustrated in FIG. 3 formed by a ring 15a which is inserted into the output drum 2a and is connected thereto.

Figure 5:
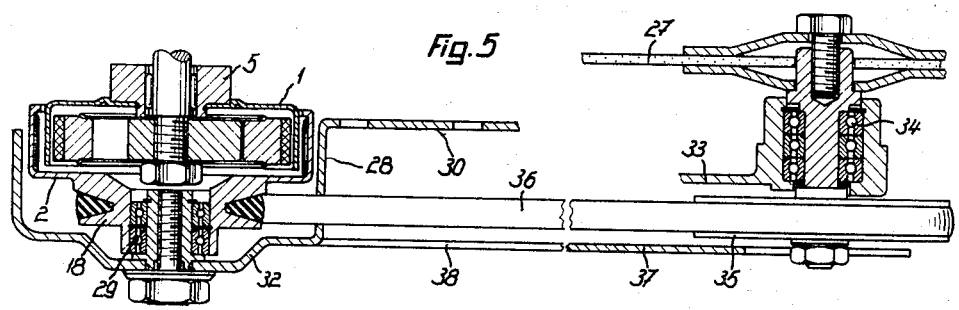
FIG. 5 is a section taken along the line V—V of FIG. 4 but on a larger scale than the latter.

As will be seen from FIGS. 4 and 5, it is possible by means of the clutch device 24 to arrange an auxiliary device 26, for instance, a cut-off machine, or cut-off grinder, on, for instance a working implement formed by a motor chain saw 25, in such a manner that the tool 27 of the auxiliary device is driven by the motor of the working implement 25. The illustrated embodiment of the invention concerns a motor chain saw 25 with inner driving sprocket wheel 5 which means that the driving sprocket wheel 5 is located between the clutch drum 1 and the motor for the motor chain saw 25. For purposes of employing the auxiliary device 26, the otherwise customary guiding rail for the saw chain is removed from the motor chain saw 25, and the output drum 2 is, in the above described manner, placed upon the exposed clutch drum 1. The output drum 2 is, by means of an antifriction bearing 29, rotatably journaled on a support 28 which adjacent to the output drum 2 comprises a connecting flange 30 for connecting the auxiliary device to the side of the housing of the motor chain saw 25 by means of bolts 31. The support 28 forms a portective cap 32 which extends around the output drum 2 from the outside thereof. The output drum 2 and pulley 18, or the like, are located in said protective cap 32.

In the extension of flange 30, the support 28 has a supporting arm 33 which, in its end, is provided with bearing means 34 for the tool 27. Arranged on the shaft of the tool 27 is a V-belt pulley 35 which is driven by the pulley 18 of output drum 2 through the intervention of a V-belt 36. At those sides of the belt pulleys which face away from the motor chain saw 25 and from the tool 27, the support 28 carries a protective plate 37 which covers the V-belt 36 and pulley 35 from the outside and is provided with an opening 38 through which the bolts 31 and the connecting flange 30 are accessible.

It is, of course, to be understood that the present invention is, by no means, limited to the specific showing in the drawings, but also comprises any modifications within the scope of the appended claims.

What is claimed is:

1. A clutch especially adapted for connecting a motor, such as a chain saw motor, to an auxiliary working implement comprising; a first drum forming one part of the clutch, a second drum forming another part of the clutch, said drum being adapted to be disposed in coaxial coextensive relation with one of said parts being drivingly connected to said motor and the other of said parts being drivingly connected to said working implement, and an elastic friction element disposed between said drums for effecting releasable clutch driving connection therebetween, said friction element being in the form of an undulating spring band carried by one drum and having rounded peaks facing the other drum, said band being of metal adapted frictionally to engage said drums, said friction element being positively secured axially with regard to one drum having two annular shoulders of which the inner diameter of one shoulder located at an open end face side of the output drum is greater than the diameter on which are located friction surfaces of the other drum forming the clutch.

2. A clutch especially adapted for connecting a motor, such as a chain saw motor, to an auxiliary working implement comprising; a first drum forming one part of the clutch, a second drum forming another part of the clutch, said drum being adapted to be disposed in coextensive relation with one of said parts being drivingly connected to said motor and the other of said parts being drivingly connected to said working implement, and an elastic friction element disposed between said drums for effecting driving connection therebetween, the inner one of said drums being closed on one side and open on the other side and having an outwardly facing peripheral surface which tapers outwardly toward said open side.

3. A clutch according to claim 2 in which said friction element is substantially uniformly distributed about the common axis of said drums.

4. A clutch according to claim 2 in which said friction element is in the form of segments distributed uniformly about the common axis of said drums.

5. A clutch according to claim 2 in which said friction element is in the form of an undulating spring band carried by one drum and having rounded peaks facing the other drum.

6. A clutch according to claim 2 in which said friction element extends the full axial length of said drums.

7. A clutch according to claim 2 in which one of said drums is closed on one side and open on the other side, said friction element being carried by said one drum and extending from the closed side thereof to the open side thereof.

8. A clutch according to claim 2 in which said friction element in axial cross section is convex toward one of said drums.

9. A clutch according to claim 2 in which said friction element is carried by the outer one of said drums and in axial cross section is convex toward the inner one of said drums.

10. A clutch according to claim 2 in which the open side of said inner drum is chamfered.

11. A clutch according to claim 2 in which said friction element is a ribbon-like spring element which is undulating over the entire axial extent thereof.

12. A clutch according to claim 11 in which said spring element is undulating when in driving engagement with both of said drums.

13. A clutch according to claim 11 in which the flanks of an undulation of said spring element are disposed at an angle of about 140° to each other.

14. A clutch according to claim 11 in which said spring element in the form of a strip mounted inside the outer one of said drums with the ends of the strip in adjacent relation.

15. A clutch according to claim 11 in which said spring element is mounted in the outer one of said drums and has friction surfaces engaging the inwardly facing surface of said outer drum over the entire axial extent of said spring element.

16. A clutch according to claim 2 in which said friction element is mounted on the inner side of the outer of said drums, annular shoulders on said outer drum confining said friction element therebetween and at least the shoulder at the open side of said outer drum being larger in diameter than the inner drum.

17. A clutch according to claim 2 in which said friction element is a steel band adapted frictionally to engage said drums, and an intermediate element between said steel band and at least one of said drums.

18. A clutch according to claim 2 which includes an output element fixed to the outside of the closed end of one of said drums.

19. A clutch according to claim 2 in which the outer drum has an output member on the outer side o' the closed end, a shaft journaled in said output member on the axis of said drum, a cap connected to the shaft and enclosing said output member, and an arm connected to said cap and adapted for being connected to the member supporting the inner drum.

20. A clutch according to claim 2 in which said friction element drivingly interconnects said drum in response to movement of said drums into telescoping relation with each other.

* * * * *